Patented June 27, 1950

2,512,698

UNITED STATES PATENT OFFICE 2,512,698

POLYMERIZATION OF AROMATIC POLYFULVENES

Ralph B. Thompson, Riverside, and Herman S. Bloch, Chicago, Ill., assignors to Universal Oil Products Company, Chicago, Ill., a corporation of Delaware No Drawing. Application November 9, 1946, Serial No. 708,934

6 Claims. (Cl. 260—93.5)

This invention concerns the production of resinous materials characterized broadly as polymeric fulvenes. More particularly, the invention relates to a process for preparing resinous products possessing either thermoplastic or thermosetting properties depending upon the reactants selected, by the polymerization of a polyfulvene individually or by the copolymerization of a mono- or polyfulvene with a polymerizable monomer other than a fulvene hereinafter more fully described.

Broadly, the invention concerns a process for polymerizing a fulvene compound and a reactant selected from the group consisting of polyfulvene and a polymerizable monomer other than a fulvene at a temperature generally above 25° C. and below about 300° C.

A monofulvene, as specified herein, which when copolymerized with at least one other class of polymerizable monomer forms the resinous product of the present invention is defined structurally as an unsaturated alicyclic compound containing at least a total of 6 carbon atoms per molecule, the cyclic portion of which is a cyclopentadiene having attached thereto through an olefinic double bonded linkage a hydrocarbon radical of at least one carbon atom in chain length. The olefinic hydrocarbon side chain which contains at least one double bond and at least one carbon atom occupies a position on the cyclopentadiene nucleus such that the olefinic linkage connecting said hydrocarbon side chain to the cyclopentadiene nucleus establishes a conjugated trienic linkage between the carbon atoms of the fulvene skeleton. The fulvene structure is represented by the following formula:

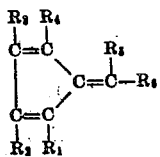

wherein each of said groups $R_1$, $R_2$, $R_3$, $R_4$, $R_5$ and $R_6$ are radicals selected from the group consisting of a hydrogen atom, an alkyl, alkenyl, cycloalkyl, aryl, aralkyl, and cycloalkenyl groups. Unsubstituted fulvene itself is represented by the above formula in which all of the substituents $R_1$, $R_2$, $R_3$, $R_4$, $R_5$ and $R_6$ are hydrogen atoms. Typical substituted fulvenes include derivatives wherein the substituents occupy a position on the side chain of the fulvene structure indicated above such as 6,6-dimethylfulvene formed by the condensation of acetone with cyclopentadiene, 6,6-diphenylfulvene formed by the condensation of diphenylketone with cyclopentadiene and homologs of monofulvene as well as derivatives thereof containing inorganic substituents such as nitro, amino, hydroxy, halo, sulfonic acid, etc. groups. Other typical derivatives include the alkyl, alkenyl, aryl, etc., derivatives where in the latter groups occupy positions on the cyclic nuclear portion of the fulvene structure such as 2,3-dimethylfulvene, 4,5-diphenylfulvene, etc. Although any of the indicated derivatives are utilizable herein as a reactant for copolymerization with one or more polymerizable monomers, it is not to be inferred that all of said derivatives are necessarily of equal effectiveness. In some instances, for example, and for some uses of the resultant product, it may be preferred to employ a monofulvene containing one or more highly unsaturated hydrocarbon substituents such as the derivatives containing alkenyl or alkadienyl side chains. If these unsaturated substituent groups differ sufficiently in reactivity from the fulvene unsaturation, a partially polymerized copolymer may be obtained which is subject to further polymerization or to subsequent "airdrying" following the initial polymerization, said drying process being somewhat similar to the oxidative polymerization type of drying process obtained when an unsaturated glyceride drying oil is exposed in thin films, for example, to atmospheric oxidation. As previously noted, the substituted fulvenes wherein the substituents occupy positions on the fulvene side chain, that is on carbon atom 6 of the fulvene structure, may be prepared by a simple condensation of cyclopentadiene with a ketone, the substituents attached to the keto group of the ketone being the same substituents attached to carbon atom 6 of the resultant fulvene compound. In the case of the condensation of cyclopentadiene with an aromatic ketone, one of the substituents in the 6-position of the fulvene product will be the aromatic residue attached to the keto group of the initial ketone reactant. Further, if the initial ketone starting material is an aliphatic or cycloalkyl compound, said aliphatic or cycloalkyl radical will appear in the corresponding 6-position of the fulvene product. Similarly, if a cyclic ketone such as cyclohexanone is employed, the radicals $R_5$ and $R_6$ of the above formula represent together the appropriate alkylene radical. It is thus within the scope of the present invention to utilize any of the above indicated substituted fulvenes in the polymerization or copolymerization reactions involved in the present process. The condensation of the ketone and cyclopentadiene to form the fulvene reactant is usually effected in alkaline medium such as an alkali alcoholate, represented for example by a methanol solution of sodium methanolate.

The reactant herein specified as an aromatic polyfulvene may be polymerized individually, that is, in the absence of other polymerizable monomers, to yield a resinous product by the type of polymerization reaction referred to in the art as "simple" polymerization, or it may be polymerized with other polymerizable monomers by means of a polymerization process known as "copolymerization" to form resinous copolymers having various properties, depending upon the reactants selected for the process. Structurally, the aromatic polyfulvenes are represented by the formula:

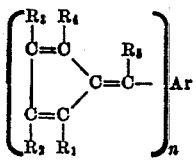

wherein each of the radicals $R_1$, $R_2$, $R_3$, $R_4$, and $R_5$ are selected from the group consisting of hydrogen, alkyl, alkenyl, cycloalkyl, cycloalkenyl, aryl, aralkyl and their homologs or other substitution products, Ar represents a polyvalent aryl group derived from such compounds as benzene, diphenyl, naphthalene, anthracene, etc. and other derivatives thereof such as the above aryl groups containing alkyl, alkenyl groups as well as the inorganic derivatives containing such substituents as halo, hydroxy, nitro, amino, etc. groups, and $n$ represents an integer generally not greater than 3 indicating the number of positions on the aryl nucleus substitutable by fulvene radicals. The aromatic difulvene reactant may be prepared by a reaction similar to the preparation of the monofulvenes, that is, by the condensation of an aromatic polyketone with cyclopentadiene, usually in the presence of an alkaline catalyst. Typical of the aromatic polyketones utilizable as reactants for the preparation of said aromatic polyfulvenes are such diketones as o-, m-, p-diacetylbenzene, the various polyacyl phenyl derivatives such as the diacetyldiphenyl compounds, diacetylbenzophenone, and others. The condensation reaction may be effected in the presence of a solvent such as an alcohol solution of the reactants in order to reduce the tendency of the resultant aromatic polyfulvene product to undergo immediate polymerization following its formation. In cases where it is desirable to store the difulvene or its solution for considerable periods of time inhibitors may be used advantageously. Inhibitors of the type of benzoquinone, nitrobenzene, etc. or the phenolic type such as tert-butyl catechol are effective and the choice of the best inhibitor will depend upon the conditions and duration of the storage.

In the production of the copolymer type of resinous polymerization product herein provided, wherein one or more polymerizable monomers other than a fulvene type monomer is mixed with a mono or polyfulvene and the mixture subjected to polymerization, the polymerizable monomer may be selected from the relatively large group of polymerizable compounds known to the art such as the vinyl type monomers represented by the vinyl halides, vinyl ketones, a vinyl alcohol or its esters, styrene, vinylidene chloride, etc.; the dienic hydrocarbon type of monomer such as butadiene, cyclopentadiene, isoprene, etc.; the ester type of drying and semi-drying oils, for example the naturally occurring glycerides (such as linseed, tung, oiticica, soybean, sardine, hempseed, perilla, poppyseed, sunflower, safflower and walnut oils) or synthetic glycerides, such as dehydrated castor oil, or esters of the unsaturated fatty acids derived from such oils with polyhydric alcohols other than glycerol, for example glycols, pentaerythritol, 1,1,1-trimethylolethane, and the like; acrylic acid and its derivatives such as methyl methacrylate, acrylonitrile, etc.; the allyl type monomers such as diallylmalonate, allyl cinnamate, etc.; maleic or fumaric acid derivatives; coumarone, indene, furfural, olefins such as isobutylene or ethylene and other monomers capable of copolymerizing with a monofulvene or an aromatic polyfulvene to yield the resinous polymerization products specified herein.

One object of the present invention is to provide a process for the production of a resinous polymer utilizing an aromatic polyfulvene of the above general decription or a mixture of various aromatic polyfulvenes as starting material and effecting a simple polymerization reaction between the polyfulvene monomers. It is another object of the invention to copolymerize a mono- or polyfulvene reactant with a polymerizable monomer other than a fulvene to form a copolymer type of product. It is still another object of the present invention to copolymerize at least partially a mixture of a mono- or polyfulvene and a cyclic polyolefinic hydrocarbon containing conjugated and nonconjugated unsaturation to form a resinoid product capable of undergoing oxidative polymerization which in turn forms a product useful as a coating composition possessing a hard, tough surface. A still further object of the invention is to provide a process for forming thermosetting resinous materials by reacting a fulvene type of compound with a polymerizable monomer capable of forming a "cross-linked" rather than a linear type of polymerization or condensation product.

In one specific embodiment of the present invention, an aromatic polyfulvene monomer is copolymerized with from about 1 to about 10 molecular proportions of a polymerizable monomer other than a fulvene at a temperature of from about 25 to about 300° C., at a pressure sufficient to maintain liquid phase, in the presence of a peroxide type polymerization catalyst, and for a reaction time sufficient to effect substantial copolymerization of the reactants.

Other embodiments of the invention referring to specific reactants and catalysts and to means herein provided for effecting the polymerization reactions will be referred to in greater detail in the following further description.

The polymerization of aromatic polyfulvenes, either separately or in admixture with a monofulvene or a polymerizable monomer other than a fulvene, usually proceeds readily by the mere application of heat to the monomers, yielding resinous polymers in the structure of which there is believed to be a considerable amount of cross linkage as evidenced by the fact that the product is ordinarily thermosetting and is insoluble in organic solvents such as alcohols, liquid hydrocarbons, etc. In effecting the polymerization of the present reactants, however, we prefer to conduct the polymerization in the presence of a catalyst which is compatible with the organic composition of the resultant product and which has a definite activity in accelerating the polymerization of the less readily polymerizable monomers represented by such mixtures as a monofulvene and a nonfulvene type monomer such as coumarone or styrene. One of the chief advantages accompanying the use of a catalyst is the fact that lower reaction temperatures are ordinarily utilizable and the polymerization reaction preceeds at a more rapid rate as well as producing a product of more controllable degree of polymerization. As the result of using a catalyst to promote the reaction it has been observed that the product does not become highly colored during the polymerization, presumably because of the generally lower reaction temperatures and shorter reaction period which may be employed when a catalyst is added to the mixture of monomers. When utilized, we prefer the organic peroxide type of catalyst, including as typical representatives thereof such compounds as di-tertbutyl peroxide, benzoyl peroxide, ascaridole, t-butyl-perbenzoate, t-butyl hydroperoxide, and the various ozonides and peroxides such as the products obtained by ozonizing or oxidizing isoprene, diisobutylene, asym-diphenylethylene, cyclohexene, phellandrene, triphenylmethyl and other hydrocarbons or hydrocarbon mixtures. Of the above peroxide type catalysts, benzoyl peroxide has been found to be suitable in most instances. When added to the original mixture of the reactants, the above peroxide type of catalyst may be allowed to remain in the resinous product upon completion of the polymerization reaction, since the reaction products from the quantity of catalytic substances introduced into the mixture of reactants (usually from about 0.01 to about 1.0% or even in some cases up to about 10% by weight of the reactants) is generally not sufficient to markedly alter the hardness or viscosity of the polymer. The catalyst is usually added to a mixture of the reacting components, preferably at a low temperature before any substantial polymerization has occurred. It is also advisable when it is desired to control the rate of polymerization and reduce the number of color bodies present in the product to rapidly disperse the catalyst into reactants and obtain a uniform distribution of the catalyst throughout the mass of reactants before increasing the temperature to the point at which polymerization occurs. The method of emulsion polymerization may likewise be used.

The reaction conditions suitable for effecting polymerization of the monomers utilized in the present process are necessarily determined by various factors such as the polymerization rate for the individual monomers, whether a catalyst is utilized and the quantity thereof in the mixture of monomers, the degree of polymerization desired, etc. In general, when polymerizing an aromatic polyfulvene either separately or in the presence of a monofulvene or another readily polymerizable monomer such as the vinyl type monomers, the reaction temperature is desirably maintained at a relatively low value, preferably within the range of from about 25° to about 100° C. In the case of copolymerizing a monofulvene with a polymerizable monomer other than fulvene which does not readily yield copolymers at relatively low temperatures, the desired range is from about 125° to about 250° C. and in some cases as high as 300° C., although the upper limit of the above temperature range is also dependent upon the decomposition temperature of the monomer as well as the depolymerization temperature of the resultant polymer product. Since the particular temperature to be employed is mutually dependent upon the factors specified above, it is generally necessary to determine the particular conditions by trial and error methods, although in many instances the preferred temperature may be predicted from the character of the monomers employed in the reaction. The pressures are generally maintained superatmospheric sufficient to maintain the reactants in liquid phase, but this factor is not considered to be an important variable in the polymerization reaction other than for the above purpose.

The reaction period during which the monomers are polymerized or copolymerized determines the physical properties of the product to a considerable degree. At temperatures generally below about 150° C. and when utilizing the fulvene monomers exclusively as the reactants, a reaction period of from about one-half to about 24 hours is ordinarily sufficient to obtain a viscous or solid resinous product, although the required length of time may be reduced when a catalyst is present in the reaction mixture. In other cases, for example when reacting the less polymerizable monomers such as the monofulvene derivatives in admixture with monomers which polymerize relatively slowly at temperatures below about 250° C., and especially when the polymerization is attempted in the absence of a catalytic substance, the reaction period may be extended to as high as 100 to 150 hours or even longer periods of time. When utilizing the aromatic polyfulvenes, the reaction period may be reduced and a solid polymer may be obtained in a shorter period of reaction than in the case of utilizing a monofulvene reactant.

In the reaction of a mono- or polyfulvene with a polymerizable monomer other than a fulvene, that is in the copolymerization process herein specified, the ratio of the reactants may be set at any convenient value consistent with the production of a desired resin. The proportion of reacting components which we have found to be especially suitable is from about 20 to 1 to about 1 to 20 weight proportions of the fulvene monomer to the nonfulvene polymerizable monomer. Even when the proportion of fulvene monomer to nonfulvene monomer is low, we have found that the properties of the resultant polymeric product are markedly different than the polymer obtained from the polymerization of the nonfulvene monomer alone. Styrene, for example, when polymerized alone yields a hard, brittle polymer, whereas when even small amounts of an aromatic difulvene is copolymerized therewith, a product may be made which possesses rubber-like properties.

A copolymer of special note, the production of which is embodied in the present invention, is the product obtained by copolymerization of a monoor polyfulvene with the highly unsaturated hydrocarbon phase separated from a catalyst-hydrocarbon sludge produced in certain hydrocarbon conversion reactions in which the catalyst is selected from the catalysts capable of causing conjunct polymerization reactions such as hydrogen fluoride, sulfuric acid, or an aluminum halide. The hydrocarbon phase separated from the catalyst-hydrocarbon sludge formed in the hydrocarbon conversion reaction contains a number of high molecular weight, cyclic, polyolefinic hydrocarbons wherein the unsaturation is of the conjugated as well as of the nonconjugated type. The copolymer of said hydrocarbon with the fulvene reactant, especially the partially polymerized product in the form of a viscous gel, contains a large number of unsaturated bonds which renders the same useful as a component in paint and varnish compositions or in applications in which a "drying" type of component is desirable. The copolymer, when utilized for such purposes, supposedly undergoes an oxidative polymerization when spread in a film on a surface exposed to atmospheric oxygen, the film hardening during the drying stage to a tough abrasion-resistant surface. The copolymerization reaction involved in the latter product is desirably controlled such that the polymerization is interrupted before a solid resinous product is obtained, a semi-liquid gel product being preferred. Such viscous semi-liquid polymers are capable of vulcanization with sulfur and are therefore useful in the manufacture of linoleum, floor tile, structural boards, and the like. Viscous fluid or gel-type copolymers of the fulvenes with glyceride drying or semi-drying oils, or similar unsaturated esters of the type described above, may likewise be employed in the preparation of coating compositions, floorings, or other structural materials.

It is within the scope of the present invention to provide a process in which the monomer or mixture of monomers is reacted to a partially resinified state, the product in such case being a solid or semi-solid resinoid material which may then be molded or extruded in a heated mold to complete the resinification reaction. The product of the initial stage may also be further mixed with additional monomer before the final resinification or molding operation. It is also practicable to conduct the polymerization reaction in the presence of a solvent for the monomers, the solvent being subsequently removed by heating the resin at a subatmospheric pressure if desired.

Resinous products obtained in the present process have widespread utility in the various arts dependent in a large measure upon the physical properties of the product. They may, for example, be composited with various drying oils such as the glyceride type or unsaturated hydrocarbon type to form varnish or paint compositions and when employed for said purposes, the resins contribute valuable film-forming and bodying properties to such compositions. Protective coatings prepared from many of the present resins form a glossy surface resistant to most chemicals, water and abrasive agents and such compositions in which solid resins produced in the present process are incorporated dry to hard, nontacky films. In some cases, the products are useful as plasticizers, especially when said product is a semi-solid or viscous liquid resin. When solid resinous products are obtained, these may be melted or extruded into variously shaped articles or used to impregnate cellulosic materials such as paper or shaped wooden articles, or the resin may be heated with wood flour, wood chips, cotton linters, asbestos, or other fibrous materials to form semi-rigid or rigid structural shapes.

The following examples refer to some of the specific aspects of the present invention, although said examples are not to be construed in such a manner as to limit the number of alternatives or variables inherent in the present invention.

EXAMPLE I 6,6'-dimethyl-p-difulvenobenzene, the methyl groups being attached to the acyclic carbon atoms of the fulvene radicals, was prepared according to the following procedure: A mixture of 16.2 grams (0.1 mol) of p-diacetylbenzene and 13.2 grams (0.2 mol) of cyclopentadiene in 150 cc. of methanol was poured slowly into a solution of 11.0 grams of sodium methanolate in 50 cc. of methyl alcohol and the resulting solution allowed to stand for 10 minutes. The solution was then poured into 700 cc. of ice water and the difulvene extracted with petroleum ether. Aliquot portions of the petroleum ether-difulvene solution were utilized in the following polymerization experiments.

EXAMPLE II

A resin melting above about 200° C. was obtained by polymerization of the difulvene prepared in Example I by the following procedure: The petroleum ether solvent was removed by evaporating said solvent from the difulvene solution thereof at approximately room temperature. The difulvene monomer polymerizes rapidly after removal of the solvent to a clear red resin.

EXAMPLE III

A quantity of the petroleum ether solution of the difulvene prepared as in Example I containing the desired amount of difulvene was measured into a polymerization reactor and the solvent rapidly evaporated from the solution in vacuo. To the difulvene monomer remaining was added various amounts of acrylonitrile and the resultant mixtures heated to the designated temperature and for the designated reaction period indicated in the following Table I:

TABLE I

Copolymerization of 6,6'-dimethyl-p-difulvenobenzene with acrylonitrile

| Acrylonitrile, Wt. Per Cent in Mixture | Time of Polymerization, hours | Temperature of Polymerization, °C. | Viscosity of Polymer, Bubble time,[1] Seconds at 20° C. |
|---|---|---|---|
| 100 | 24 | 25 | 8.0 |
| 100 | 72 | 25 | 8.0 |
| 100 | 144 | 71 | Infinite |
| 100 | 168 | 127 | Hard Solid |
| 50 | 24 | 25 | Precipitate |
| 50 | 72 | 25 | 15 |
| 50 | 168 | 127 | 23 |
| 50 | 192 | 143 | Hard Solid |
| 10 | 24 | 25 | 160 |
| 10 | 48 | 25 | Infinite |
| 10 | 144 | 71 | Soft Solid |
| 10 | 168 | 127 | Hard Solid |

[1] Bubble time was utilized herein as a measurement of viscosity of the polymerization mixture and as a rough indication of the degree of polymerization. The polymerization reactor, a sealed glass tube containing the monomers at 20° C. is inverted and the number of seconds time required for an air bubble to rise through the column of reactants at 20° C. is the herein referred to "Bubble Time." Infinite Bubble Time indicates that bubble does not perceptibly rise in reactor tube after one hour.

EXAMPLE IV

A procedure similar to Example III was employed for the copolymerization of styrene and 6,6'-dimethyl-p-difulvenobenzene, data for which is given in the following Table II.

TABLE II

Copolymerization of 6,6'-dimethyl-p-difulvenobenzene with styrene

| Styrene, Wt. Per Cent in Mixture | Time of Polymerization, hours | Temperature of Polymerization, °C. | Viscosity of Polymer, Bubble time, Seconds at 20° C. |
|---|---|---|---|
| 100 | 24 | 25 | 8.0 |
| 100 | 144 | 71 | Infinite |
| 100 | 168 | 127 | Hard Solid |
| 90 | 24 | 25 | 9.0 |
| 90 | 144 | 71 | 11.0 |
| 90 | 168 | 127 | Rubbery Solid |
| 90 | 216 | 143 | Hard Solid |
| 10 | 48 | 25 | Infinite |
| 10 | 144 | 71 | Soft Solid |
| 10 | 168 | 127 | Hard Solid |

EXAMPLE V

The procedure described in Example II was employed for the copolymerization of diallyl maleate and 6,6'-dimethyl-p-difulvenobenzene, data for which is given in the following Table III.

TABLE III

Copolymerization of 6,6'-dimethyl-p-difulvenobenzene with diallylmaleate

| Diallylmaleate, Wt. Per Cent in Mixture | Time of Polymerization, hours | Temperature of Polymerization, °C. | Viscosity of Mixture, Bubble time, Seconds at 20° C. |
|---|---|---|---|
| 100 | 24 | 25 | 8.0 |
| 100 | 144 | 71 | Infinite |
| 100 | 168 | 127 | Hard Solid |
| 50 | 48 | 25 | 287 |
| 50 | 92 | 25 | 360 |
| 50 | 144 | 71 | Infinite |
| 50 | 216 | 143 | Hard Solid |
| 10 | 24 | 25 | Two phases |
| 10 | 48 | 25 | Infinite |
| 10 | 144 | 71 | Soft Solid |
| 10 | 168 | 127 | Hard Solid |

EXAMPLE VI

A petroleum ether solution of 6,6'-dimethyl-p-difulvenobenzene was used to impregnate a sample of wood flour (2 parts by weight of wood flour per part of difulvene). The impregnated wood flour was polymerized for 2 days at 71° C. forming an orange powder which upon molding at about 5000 pounds per square inch pressure and at temperatures of from about 130° to about 160° C. formed strong, hard discs.

EXAMPLE VII 6-methyl-6-phenylfulvene, prepared by the condensation of acetylbenzene and cyclopentadiene in a methanol solution of sodium methanolate was copolymerized with various copolymerizable monomers other than fulvenes indicated in the following Table IV. The reaction temperature was gradually raised from an initial 25° to a final 125° C. over a period of 36 days total reaction time. The copolymerization was catalyzed in each case by the addition of 0.5 weight percent of benzoyl peroxide to the mixture of reactants.

TABLE IV

Copolymerization of 6-methyl-6-phenylfulvene with various polymerizable monomers other than fulvenes

| Copolymerizable Monomer | Weight Per Cent Copolymerizable Monomer | Viscosity of Copolymer after 10 Days Reaction, Bubble Time [2] at 20° C. | Viscosity of Copolymer After 21 Days Reaction Bubble Time [2] at 20° C. | Properties of Copolymer After 36 Days |
|---|---|---|---|---|
| Methyl Acrylate | 70 | 2.0 | 2.2 | Yellow solid, slightly sticky. |
| Do | 10 | 23.8 | Infinite | Red solid, hard. |
| Styrene | 70 | 2.8 | Infinite | Amber solid, hard. |
| Do | 10 | 5.0 | Infinite | Red solid, hard. |
| Acrylonitrile | 90 | Infinite | Infinite | Opaque solid, hard. |
| Do | 70 | 2.6 | 3.0 | Amber solid, slightly sticky. |
| Do | 10 | 20.2 | Infinite | Do. |
| Vinyl Acetate | 30 | 2.0 | 2.6 | Viscous red fluid. |
| Do | 10 | 2.6 | Infinite | Red solid, slightly sticky. |
| Polyolefinic Hydrocarbon [1] | 30 | 6.0 | Infinite | Very viscous liquid. |
| Do [1] | 10 | 8.2 | Infinite | Red solid, sticky. |

[1] Hydrocarbon phase recovered by hydrolysis of a hydrogen fluoride-polymer gasoline (octene fraction) sludge, having a bromine number of 195, a maleic anhydride value of 85 and containing on the average of 3.5 conjugated double bonds per molecule thereof.
[2] See footnote 1, Table I.

We claim as our invention:

1. A process for producing a resinous material which comprises subjecting to a polymerizing reaction at a temperature of from about 25° C. to about 300° C. an aromatic polyfulvene in which the aryl radical is attached to the acyclic carbon atom of each of the fulvene radicals.

2. The process of claim 1 further characterized in that said polyfulvene is subjected to the polymerizing reaction in admixture with a monofulvene.

3. The process of claim 1 further characterized in that the polymerizing reaction is the simple polymerization of said polyfulvene.

4. A process for producing a resinous material which comprises subjecting to simple polymerization at a temperature of from about 25° C. to about 300° C. an aromatic difulvene in which the aryl radical is attached to the acyclic carbon atom of each of the fulvene radicals.

5. The process of claim 1 further characterized in that said aromatic polyfulvene is dimethyl-p-difulvenobenzene in which each of the methyl groups is attached to the acyclic carbon atom of one of the fulvene radicals.

6. The process of claim 4 further characterized in that said aromatic polyfulvene is dimethyl-p-difulvenobenzene in which each of the methyl groups is attached to the acyclic carbon atom of one of the fulvene radicals.

RALPH B. THOMPSON.
HERMAN S. BLOCH.

REFERENCES CITED

The following references are of record in the file of this patent:

Carmody Ind. and Eng. Chem., vol. 32, pp. 525-527 (1940).

Thiele Berichte, vol. 33, pp. 666-672 (1900).